United States Patent Office 2,793,163
Patented May 21, 1957

2,793,163

11β-HYDROXYLATION OF PREGNADIENES BY CONIOTHYRIUM HELLEBORINE

Richard W. Thoma, Somerville, and John R. Gerke and Josef Fried, New Brunswick, N. J., assignors to Olin Mathieson Chemical Corporation, New York, N. Y., a corporation of Virginia No Drawing. Application July 18, 1955,
Serial No. 522,850

4 Claims. (Cl. 195—51)

This application is a continuation-in-part of our parent application, Serial No. 371,728, filed July 31, 1953.

This invention relates to a biosynthetic method for the preparation of 11β-hydroxy-steroids of the pregnane (including the pregnene and pregnadiene) series, especially for the preparation of hydrocortisone and $\Delta^{1,4}$-pregnadiene-11β,17α,21-triol-3,20-dione and 21-esters thereof, involving microbiological oxidation of the corresponding 11-desoxy-steroid, especially 11-desoxy-17α-hydroxy-corticosterone (also known as $\Delta^4$-pregnene-17α,21-diol-3,20-dione and, as hereinafter referred to for brevity, as "Compound S"), $\Delta^{1,4}$-pregnadiene-17α,21-diol-3,20-dione and 21-esters thereof.

More particularly, the method of this invention involves subjecting an 11-desoxy-steroid of the pregnane series, especially Compound S, $\Delta^{1,4}$-pregnadiene-17α,21-diol-3,20-dione or a 21-ester thereof to the action of an enzyme (or enzymes, or enzyme system) of a microorganism of the genus Coniothyrium (preferably *Coniothyrium helleborine*) in an aqueous medium in the presence of oxygen, and recovering the 11β-hydroxy-steroid (e. g., hydrocortisone, $\Delta^{1,4}$-pregnadiene-11β,17α,21-triol-3,20-dione or a 21-ester thereof) formed. The action of the enzyme can be utilized either by including the steroid in an aerated culture of the microorganism in or on a suitable nutrient medium, or by bringing together in an aqueous medium the steroid, oxygen, and the enzyme of non-proliferating cells of the microorganism, the first alternative being preferred.

The 11-desoxy-steroids utilizable in the method of this invention include, inter alia, Compound S (yielding hydrocortisone), progesterone (yielding 11β-hydroxyprogesterone), desoxycorticosterone (yielding corticosterone), 17α-hydroxyprogesterone (yielding 11β,17α-dihydroxyprogesterone), and $\Delta^{1,4}$-pregnadiene-17α,21-diol-3,20-dione and 21-esters thereof. Among the suitable esterifying acids, if a 21-ester is used, are the organic carboxylic acids, particularly the hydrocarbon carboxylic acids having less than ten carbon atoms as exemplified by the lower alkanoic acids (e. g. acetic, propionic, butyric and enanthic acids), the lower alkanedioic acids (e. g. succinic acid), the hydrocarbon aromatic acids (e. g. benzoic acid), and the hydrocarbon aralkanoic acids (e. g. phenylacetic and β-phenylpropionic acids).

A suitable nutrient medium essentially comprises a source of nitrogenous factors and an assimilable source of carbon and energy. The latter may be a carbohydrate (such as sucrose, molasses, glucose, maltose, starch, or dextrin), a fatty acid, a fat and/or the steroid itself. Preferably, however, the medium includes an assimilable source of carbon and energy in addition to the steroid. Among the fats utilizable for the purpose of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fatty acids utilizable for the purpose of this invention are: stearic acid, palmitic acid, oleic acid, linoleic acid, and myristic acid.

The source of nitrogenous factors may be organic (e. g. soybean meal, corn steep liquor, meat extract and/or distillers solubles) or synthetic (i. e. composed of simple, synthesizable organic and inorganic compounds such as ammonium salts, alkali nitrates, amino acids or urea).

An adequate sterile-air supply should be maintained during fermentation, for example, by the conventional methods of exposing a large surface of the medium to air or by utilizing submerged aerated culture.

The steroid may be added to the culture during the incubation period, or included in the medium prior to sterilization or inoculation. The preferred (but not limiting) range of concentration of the steroid in the culture is about 0.01 to 0.10%. The culture period (or rather the time of subjecting the steroid to the action of the enzyme) may vary considerably, the range of about 6 to 96 hours being feasible, but not limiting.

The 11β-hydroxy-steroid (e. g., hydrocortisone) formed may be detected and quantitatively measured without isolation by paper chromatography of a concentrated extract of the culture filtrate, and (in the cases of hydrocortisone and corticosterone) confirmed by rat glycogen deposition assay. The paper chromatography method, based on that of Zaffaroni and Burton [J. Biol. Chem., 193, 749–67 (1951)], involves careful standardization based on hydrocortisone (for example) moving at one-third the rate of Compound S in the benzene-water system, and on its moving at four times the rate of 11-epi-hydrocortisone in a benzene-ethanol-water system. Thus, 8.0 ml. of culture filtrate is equilibrated with 5.0 ml. of methylisobutyl ketone (MIBK), 4.0 ml. of the MIBK phase is separated, evaporated to dryness and redissolved in 0.20 ml. of a 1:1 mixture of chloroform and absolute ethanol. An amount of this chloroform-ethanol solution containing 10–100γ hydrocortisone is applied to the paper strip, and the developed chromatogram is charted with the aid of an ultraviolet scanning device [Haines and Drake, Fed. Proc., 9, 180 (1950)]. The hydrocortisone zone is then cut out, eluted with 10 ml. 95% ethanol, and the ultraviolet absorption at 240 mμ is determined. Quantitative estimates are then made by reference to a standard curve prepared by adding several levels of hydrocortisone to 8.0 ml. aliquots of unfermented nutrient medium, and carrying out the extraction.

The 11β-hydroxy steroid formed, may be recovered from the culture in which it is formed by extraction with an organic solvent (e. g. methyl isobutyl ketone, chloroform and methylene dichloride), followed by concentration of the extract and crystallization from a suitable organic solvent.

The following examples are illustrative of the invention:

EXAMPLE 1

$\Delta^{1,4}$-*pregnadiene-11β,17α,21-triol-3,20-dione*

(a) *Fermentation.*—A fermentation medium of the following composition is prepared:

| | Grams |
|---|---|
| Starch | 20 |
| Malted cereal extract syrup | 10 |
| Peptone | 20 |
| Cerelose | 44 |
| $NaNO_3$ | 3 |
| $KH_2PO_4$ | 1 |
| KCl | 0.5 |
| $MgSO_4 \cdot 7H_2O$ | 0.5 |
| $FeSO_4 \cdot 7H_2O$ | 0.0183 |
| Water to make one liter. | |

The pH of the medium is adjusted to 7.0±0.1 with 2 N NaOH solution, and 50 ml. portions of the medium are distributed in 250 ml. Erlenmeyer flasks, and the flasks are plugged with cotton and sterilized by autoclaving for 30 minutes at 120° C. When cool, each of the flasks is inoculated with 5% of a spore suspension of *Coniothyrium helleborine* (obtainable, inter alia, from the Department of Botany, Kansas State College and the American Type Culture Collection, Washington, D. C., wherein it has been assigned the catalogue number 12,522). [The sporulated culture is obtained by growing the microorganism on cracked corn for two to three weeks to allow maximum sporulation to occur. The suspension is made preferably in 0.01% aqueous Duponal solution. 2.5 ml. of suspension, containing about one-sixtieth of the spores from 15 g. of corn, is used to inoculate 50 ml. of the first shaker flask stage.]

The flasks are then mechanically shaken for 66 hours on a 280 cycle per minute rotary shaker at 25° C. and 6% by volume transfer is then made to 40 flasks (250 ml.) containing 50 ml. portions of the following medium:

| | Grams |
|---|---|
| Glucose | 40 |
| $NaNO_3$ | 3 |
| $KH_2PO_4$ | 1 |
| Water to make one liter. | |

Incubation is then carried out for 48 hours at 25° C. by mechanically shaking on a 280 cycle per minute rotary shaker, after which 500 mg. of $\Delta^{1,4}$-pregnadiene-17α,21-diol-3,20-dione is added in 20 ml. of methanol. Incubation is continued for another 48 hours. The contents of the flasks are pooled, filtered on a Seitz pad, and washed through with about 10% water. The volume of filtrate and wash is 1875 ml.

(*b*) *Isolation of the $\Delta^{1,4}$-pregnadiene-11β,17α,21-triol-3,20-dione.*—The thus-obtained culture filtrate is extracted with 3 one-liter portions of chloroform and the resulting chloroform solution evaporated to dryness in vacuo. The residue (about 238 mg.) is triturated with chloroform and the resulting crystalline precipitate (about 146 mg.), which consists of a mixture of starting material and the desired hydroxylated product, is acetylated with 2 ml. of anhydrous pyridine and 2 ml. of acetic anhydride at room temperature for 18 hours. The mixture of acetates obtained by evaporation of the reagents is crystallized four times from 95% alcohol, yielding pure $\Delta^{1,4}$-pregnadiene-11β,17α,21-triol-3,20-dione 21-acetate, M. P. about 237–239° C. $[\alpha]_D^{23}+112°$ (dioxane);

$$\lambda_{max.}^{Nujol}\ 2.97\mu$$

3.07μ, 5.72μ, 5.81μ, 6.16μ, 6.24μ, 6.30μ [which infrared spectrum is identical with that of an authentic sample].

Saponification of the above 21-acetate with potassium carbonate in methanol furnishes authentic $\Delta^{1,4}$-pregnadiene-11β,17α,21-triol-3,20-dione, M. P. about 239–240° C.

EXAMPLE 2

(*a*) *Fermentation.*—A fermentation medium (A) of the following composition is prepared:

| | Grams |
|---|---|
| Cornsteep liquor solids | 3.0 |
| $(NH_4)H_2PO_4$ | 3.0 |
| $CaCO_3$ | 2.5 |
| Soybean oil | 2.2 |
| Yeast extract | 2.5 |
| Glucose | 10 |
| Distilled water to make one liter. | |

[The same medium may be employed for germination of the inoculating microorganism.] The pH of the medium is adjusted to 7.0±0.1 with 2 normal NaOH solution; 0.5 g. of Compound S is added; 100 ml. portions of the medium are distributed in 500 ml. Erlenmeyer flasks, and the flasks are plugged with cotton and sterilized by autoclaving for 30 minutes at 120° C.; and when cool each of the flasks is inoculated with 5–10% of a vegetative inoculum of *Coniothyrium helleborine.* [A stock culture of the microorganism is obtainable from the Department of Botany, Kansas State College and the American Type Culture Collection, Washington, D. C. under number 12,522; and the inoculum is obtained by growing the microorganism in a medium of the same composition for 48 hours.] The flasks are then mechanically shaken for 72 hours in a room maintained at 25° C., following which the contents of the flasks are pooled, adjusted to pH 4.0±0.2 with 12 N sulfuric acid, and filtered by suction through Seitz filter pads to remove the mycelium.

(*b*) *Isolation of the hydrocortisone formed.*—A quantity of culture filtrate obtained as described in *a* by fermentation of 2.0 g. of Compound S is extracted with twice its volume of chloroform, and the chloroform extract is filtered and evaporated to dryness in vacuo. The residue (total steroid fraction, weighing about 1.166 g.), is triturated with chloroform, leaving behind a crystalline residue weighing about 256 mg. and melting at about 197–200° C., 244 mg. of this crystalline residue is acetylated with 1 ml. of acetic anhydride in 2 ml. of pyridine for 16 hours at room temperature, and the acetylating reagents are removed in high vacuum. The residue (weighing about 268 mg.) is dissolved in 1 ml. of chloroform and 9 ml. of benzene, and the solution is chromatographed on 5 g. of silica gel. Elution with chloroform in benzene (1:1) yields first a lower melting fraction (185–192° C.; about 28 mg. in 75 ml.), followed by essentially pure 11-epi-F diacetate (about 97 mg. in about 500 ml.). After recrystallization from acetone-hexane, the latter melts at 223–225° C., shows no depression of melting point when mixed with an authentic sample of 11-epi-F diacetate, and has an infrared spectrum identical with that of the sample. Further elution of the column with chloroform yields an additional amount of 11-epi-F diacetate (about 37 mg. in about 100 ml.), followed by a mixed fraction in the next 200 ml. of chloroform. Final elution with chloroform (about 500 ml.) and evaporation of the chloroform yields about 17 mg. of crystalline material, differing from the 11-epi-F diacetate by its low solubility in chloroform. Recrystallization of this finally eluted material from acetone yields pure hydrocortisone acetate, having the following properties: M. P. 216–219° C.; $[\alpha]_D+156°$ (c., 0.32 in chloroform);

$$\lambda_{max.}^{alc.}\ 241\ m\mu(\epsilon=16,700)$$

infrared spectrum identical with that of an authentic sample of hydrocortisone acetate.

Hydrocortisone may be produced from its acetate thus obtained by conventional means, e. g., hydrolysis with dilute sodium bicarbonate solution; and, if desired, the hydrocortisone may be converted into esters of other acids.

EXAMPLE 3

The same fermentation conditions as described in section *a*, Example 2, are employed except the inoculum is a 48-hour culture of the microorganism in fermentation medium A, the fermentation medium contains 300 mg. of Compound S per 600 ml., and the culture is harvested at 67 hours.

EXAMPLE 4

The same fermentation conditions as described in section *a*, Example 2, are employed, except that the Compound S is added to the 24-hour culture, 100 mg. of this compound in 3.0 ml. of methanol being added to each 100 ml. of culture. A 10% conversion of the compound to hydrocortisone is obtained after 24 hours incubation of the medium.

EXAMPLE 5

*Coniothyrium helleborine* is grown in fermentation medium A (inoculation being with a 48-hour growth in the same medium, originating with spores) for 48 hours;

then desoxycorticosterone (in methanol) is added to give a 0.025% desoxycorticosterone concentration (and 1% methanol concentration) in the medium; and after 24 hours incubation, the culture is harvested and the culture filtrate treated (e. g., by chloroform extraction and chromatographic fractionation) to recover the corticosterone (and 11-epi-corticosterone) formed.

The invention may be otherwise variously embodied within the scope of the appended claims.

We claim:

1. The method of producing a steroid selected from the group consisting of $\Delta^{1,4}$-pregnadiene-11$\beta$,17$\alpha$,21-triol-3,20-dione and 21-esters thereof, which comprises subjecting a steroid selected from the group consisting of $\Delta^{1,4}$-pregnadiene-17$\alpha$,21-diol-3,20-dione and 21-esters thereof to the action of an enzyme of *Coniothyrium helleborine* in an aqueous medium in the presence of oxygen, and recovering the steroid formed.

2. The method of claim 1 wherein the steroid is $\Delta^{1,4}$-pregnadiene-17$\alpha$,21-diol-3,20-dione.

3. The method of producing an 11$\beta$-hydroxy-steroid of the pregnane series, which comprises subjecting the corresponding 11-desoxy-steroid to the action of an enzyme of *Coniothyrium helleborine* in an aqueous medium in the presence of oxygen, and recovering the 11$\beta$-hydroxy-steroid formed.

4. The method of producing hydrocortisone, which comprises subjecting Compound S to the action of an enzyme of *Coniothyrium helleborine* in an aqueous medium in the presence of oxygen, and recovering the hydrocortisone formed.

References Cited in the file of this patent

UNITED STATES PATENTS

| | | |
|---|---|---|
| 2,602,769 | Murray | July 8, 1952 |
| 2,649,400 | Murray | Aug. 18, 1953 |
| 2,649,401 | Haines | Aug. 18, 1953 |
| 2,649,402 | Murray | Aug. 18, 1953 |
| 2,658,023 | Shull | Nov. 3, 1953 |